Patented Nov. 20, 1951

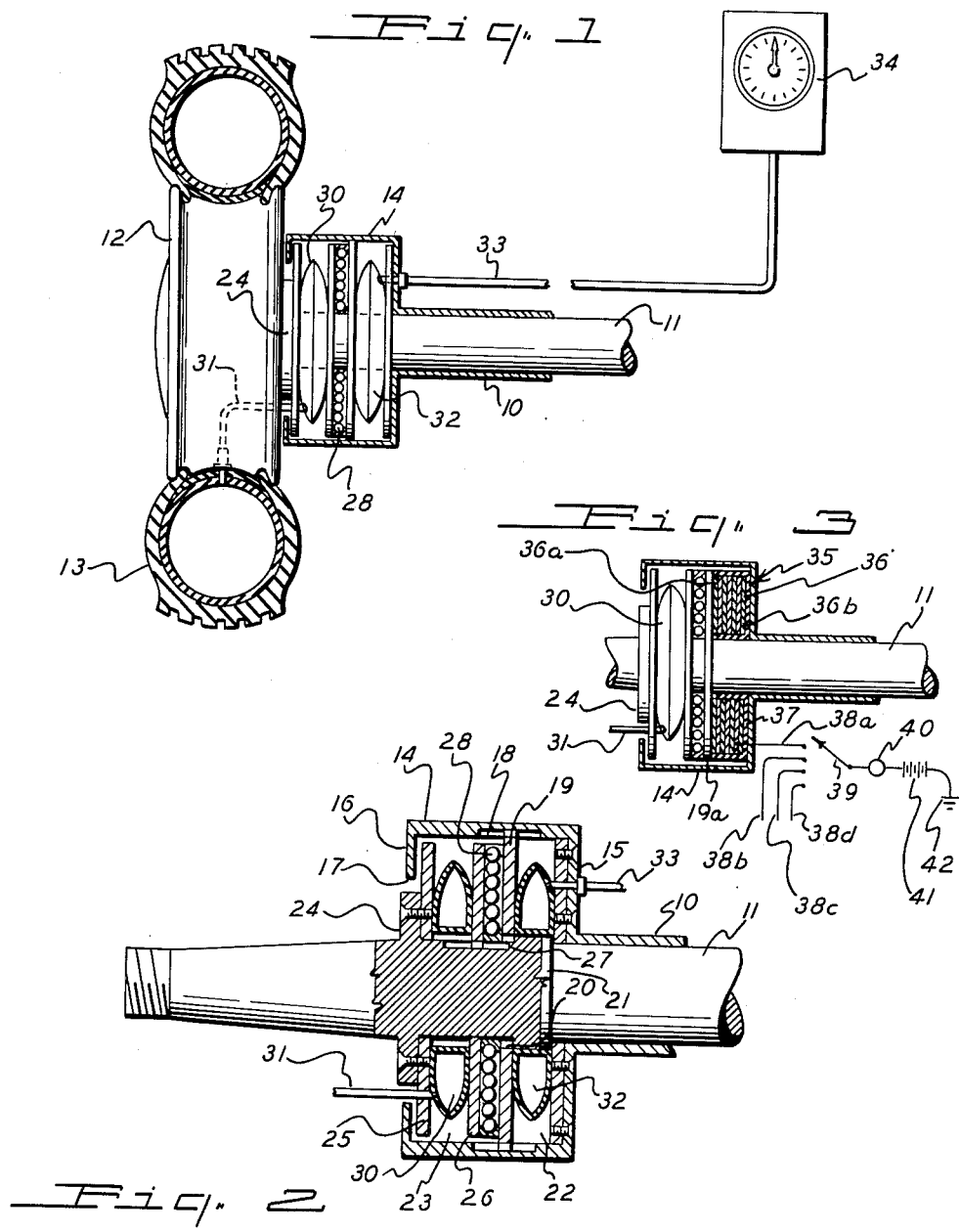

2,575,849

UNITED STATES PATENT OFFICE 2,575,849

TIRE PRESSURE INDICATOR

Ray L. Steven, Los Angeles, Calif.

Application March 21, 1945, Serial No. 584,016

2 Claims. (Cl. 201—48)

1

This invention relates to motor vehicle structures, and more especially to a tire pressure indicator.

An object of the invention is to provide a simple, practical and efficient tire pressure indicator of the character described.

Another object of the invention is to provide a tire pressure indicator, whereby the pressure of any of the tires of a motor vehicle can be indicated at the dash of the motor vehicle at all times and even while the motor vehicle is being operated.

A further object of the invention is to provide a tire pressure indicator, wherein the pressure of each tire is transmitted to a device or indicator located at the dash of the motor vehicle, whereby the pressure of all of the tires may be read at any time.

Another object of the invention is to provide a tire pressure indicator of the character described in which the tire pressure may be transmitted to the dash by either of several mediums including pneumatic, hydraulic, mechanical and electric means.

Other objects and advantages will appear and be brought out more fully in the following specification, reference being had to the accompanying drawing, wherein:

Fig. 1 is an elevation view in section showing a motor vehicle wheel and a portion of the axle structure showing an embodiment of my invention associated therewith.

Fig. 2 is an enlarged view in section showing the pressure responsive features also shown in Fig. 1.

Fig. 3 is a view similar to Fig. 2 showing a modified form of the invention.

Referring more particularly to the drawing, I show the wheel and axle portion of a motor vehicle which comprises an axle housing 10 fixed to the motor vehicle body, and a rotary axle 11 suitably bearing mounted therein, a wheel 12 being secured to axle 11 and having a pneumatic tire 13 thereon.

My invention comprises a housing or casing 14 secured to axle housing 10 and having a wall 15 and a wall portion 16 which provides an annular opening 17 through which the end of axle 11 extends. Housing 14 is provided with a plurality of grooves 18 formed internally, the grooves extending substantially parallel to the axis of axle 11. Grooves 18 form guides for peripheral portions of an annular wall 19 which has a central opening 20 for axially slidable movement on a hub portion 21 of axle 11. Wall 19 provides in

2 effect a pair of chambers 22 and 23 within the housing 14.

Axle 11 is formed with a flange 24 to which is suitably secured an annular plate 25, and an annular plate 26 is axially slidable on hub 21 of axle 11 within chamber 23 and rotatable with the axle, there being one or more axially extending grooves 27 in axle 11 which engage lug portions of plate 26 for effecting rotational movement of the plate with the axle. I show a plurality of roller bearings 28 positioned between wall 19 and plate 26 and adapted to provide rotational engagement therebetween and to transmit pressure from plate 26 to wall 19. It will be understood that the particular form of bearing elements 28 is not important, and other types of bearings may be used if desired.

I show a pressure responsive element 30 positioned in chamber 23, which element is preferably an inflatable or expansible element, such as a pneumatic tube, the interior thereof being connected by a pipe or tube 31 to tire 13, from which construction it will be apparent that element 30 rotates with axle 11 and wheel 12 and tire 13, and that the pressure of tire 13 is the same as that within element 30, and that upon changes in this pressure plate 26 will be moved axially to the right upon an increase in such pressure and to the left upon a decrease of such pressure. A similar pressure responsive element 32 is positioned in chamber 22, and a side portion thereof is adjacent slidable wall 19, and from which construction it will be clear that movement of wall 19 by plate 26 upon changes in pressure in pressure element 30 a similar pressure will be maintained in element 32. The interior of element 32 is in communication through a pipe 33 to a pressure indicator 34, preferably located on the dash of the motor vehicle or other place convenient for being visible to the operator thereof.

The operation of the invention, as thus described, should be apparent. The pressure of tire 13 is the same as that within pressure responsive element 30, which pressure is transmitted through plate 26, bearings 28 and wall 19 to pressure responsive element 32. The pressure in element 32 is indicated by gauge 34 with which it is in direct communication, and that the gauge 34 at all times shows the pressure in tire 13 which may be corrected if such pressure becomes lower or higher than the proper operating pressure for the vehicle. It will be understood that each wheel of the vehicle will be provided with a similar tire indicator, and it will also be clear that a single gauge 34 may be arranged for showing the pressure of any of the tires by the use of suitable selective valve means. It will also be understood that the fluid medium in pressure responsive element 32 in pipe 33 may be air or may be a hydraulic fluid, such as oil or the equivalent.

In Fig. 3 I show a modified form of my invention. In this form of the invention the axle and housing structures and pressure responsive element 30 are substantially the same as in Figs. 1 and 2. I show a wall 19a which is non-rotatable, but slidable axially as wall 19, pressurally engages a pressure responsive element 35 which comprises a plurality of annular discs 36 of carbon, there being an inner disc 36a in contact with wall 19a and thereby electrically grounded to the frame of the motor vehicle and an outer disc 36b adjacent an end wall of an insulated housing 37 which retains the discs 36 in place within housing 14. Plate 36b is connected by a wire 38a to one of several switch contacts of a switch 39, the other contacts of the switch being connected by wires 38b, 38c and 38d to the similarly positioned disc in the other pressure responsive elements 35 of the other wheels of the vehicle of which there are four in the example shown, but may be more if the vehicle has more than four wheels. Switch 39 is connected to an electric meter 40 and battery 41 which is grounded at 42.

In this modified form of the invention the pressure of the tire reflected in pressure responsive element 30 is transmitted through wall 19a to the carbon discs 36 of pressure responsive element 35, and changes in the pressure of the discs change the electrical resistance of the group of discs and will produce a variation in the indication of electric meter 40 which may be suitably calibrated in terms of "pounds" pressure. Switch 39 may be switched to the several contacts for reading the pressure of any of the tires of the vehicle.

While I have shown and described several forms which my invention may assume, it will be understood that these forms are illustrative only and not restrictive of the invention, and that changes and modifications may be made without departing from the spirit and scope of the subjoined claims.

Having thus described my invention, what I claim and desire to secure by Letters Patent is:

1. In an electrical tire pressure indicator having a casing on an axle and an inflatable annular pressure responsive element in the casing, a fixed annular pressure responsive variable resistor and a thrust bearing between said resistor and said pressure responsive element, said resistor comprising a disc of carbon.

2. In an electrical tire pressure indicator having a casing on an axle and an inflatable annular pressure responsive element in the casing, a fixed annular pressure responsive variable resistor and a thrust bearing between said resistor and said pressure responsive element, said resistor comprising a plurality of discs of carbon.

RAY L. STEVEN.

REFERENCES CITED

The following references are of record in the file of this patent:

UNITED STATES PATENTS

| Number | Name | Date |
| --- | --- | --- |
| 1,581,320 | Pumphrey, Jr. | Apr. 20, 1926 |
| 1,594,993 | Bedford | Aug. 2, 1926 |
| 1,811,769 | Weaver | June 23, 1931 |
| 1,849,139 | Denmire | Mar. 15, 1932 |
| 1,907,608 | Subkow | May 3, 1933 |
| 1,921,550 | Swallen | Aug. 8, 1933 |
| 2,033,424 | Gieskieng | Mar. 10, 1936 |
| 2,119,287 | Pratt | May 31, 1938 |
| 2,145,363 | Miller | Jan. 31, 1939 |
| 2,181,981 | Smith | Dec. 5, 1939 |
| 2,213,949 | Brown | Sept. 10, 1940 |
| 2,253,118 | Gillespie et al. | Aug. 19, 1941 |
| 2,265,077 | Manning et al. | Dec. 2, 1941 |
| 2,353,428 | Akin | July 11, 1944 |